(12) United States Patent
Maine, Jr. et al.

(10) Patent No.: US 7,565,967 B2
(45) Date of Patent: Jul. 28, 2009

(54) SELF CLEANING ROTATABLE MEMBER FOR WOVEN WIRE MESH CONVEYOR BELT

(75) Inventors: Robert E. Maine, Jr., Salisbury, MD (US); George Howard Messick, Jr., East New Market, MD (US); Michael Robert Franzoni, Providence, RI (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 12/149,358

(22) Filed: Apr. 30, 2008

(65) Prior Publication Data

US 2009/0000922 A1    Jan. 1, 2009

Related U.S. Application Data

(60) Provisional application No. 60/924,109, filed on Apr. 30, 2007.

(51) Int. Cl.
*B65G 23/04* (2006.01)
(52) U.S. Cl. .................. 198/835; 198/834; 198/848
(58) Field of Classification Search .......... 198/832, 198/834, 835, 848
See application file for complete search history.

(56) References Cited

U.S. PATENT DOCUMENTS

| | | | |
|---|---|---|---|
| 4,253,344 A | | 3/1981 | Kerklies |
| 4,685,557 A | * | 8/1987 | Roinestad .............. 198/834 |
| 5,141,099 A | | 8/1992 | Baumgartner |
| 5,156,263 A | * | 10/1992 | Ledet .................. 198/834 |
| 5,160,020 A | * | 11/1992 | Thomas, Sr. ........... 198/834 |
| 5,271,491 A | | 12/1993 | Irwin |
| 5,449,063 A | | 9/1995 | Thomas, Sr. |
| 5,950,807 A | | 9/1999 | Greer |
| 6,758,776 B2 | * | 7/2004 | Fye et al. ............. 198/834 |
| 6,766,899 B1 | | 7/2004 | Guldenfels |
| 6,938,754 B2 | * | 9/2005 | Kanaris ............... 198/835 |
| 7,025,196 B2 | * | 4/2006 | Pfarr et al. ............ 198/813 |
| 7,070,042 B2 | | 7/2006 | Dow et al. |
| 7,270,232 B2 | * | 9/2007 | Schiltz ............... 198/835 |
| 2003/0089583 A1 | | 5/2003 | Depaso et al. |
| 2003/0144098 A1 | | 7/2003 | Fye et al. |
| 2005/0077152 A1 | | 4/2005 | Pfarr et al. |
| 2007/0080048 A1 | | 4/2007 | Messick, Jr. et al. |

OTHER PUBLICATIONS

International Search Report dated Dec. 1, 2008 in PCT/US2008/05490.
International Search Report dated Dec. 2, 2008 in PCT/US2008/010983.

* cited by examiner

*Primary Examiner*—James R Bidwell
(74) *Attorney, Agent, or Firm*—Buchanan Ingersoll & Rooney PC

(57) ABSTRACT

A rotatable member, for use with an elongated woven-wire belt assembled from spiral wires and connector rods which define recesses, of preselected uniform cross-sectional configurational and dimensional characteristics and having a preselected depth dimension for confronting a rotatable member. The rotatable member includes a hollow tubular member defining an outer cylindrical surface symmetrically disposed in relation to a central axis of rotation for the rotatable member, a plurality of rows of uniformly radially-oriented protrusions on the cylindrical surface for use in engaging recesses presented by interwoven spiral wires and connector rods of a woven-wire belt, and a plurality of slotted opening formed between the adjacent rows of protrusions.

19 Claims, 7 Drawing Sheets

SELF CLEANING ROTATABLE MEMBER FOR WOVEN WIRE MESH CONVEYOR BELT

This application relies upon and claims the benefit of priority under 35 U.S.C. 119(e) from U.S. Provisional Application Ser. No. 60/924,109, filed on Apr. 30, 2007.

FIELD OF THE INVENTION

The present invention is directed to a rotatable member for a conveyor belt, more particularly to a self cleaning drive roll or sprocket member configured to avoid a build up of product and debris thereon, and still more particularly, for use in cleaning the openings of a woven wire mesh conveyor belt.

BACKGROUND OF THE INVENTION

Referring to FIG. 1, the illustrated woven wire conveyor system 30 includes a plurality of helically-wound spiral wires 20 disposed between two connector rods 22, 24 which are positioned to be sequentially adjacent in the lengthwise direction of belt assembly and intended travel. Such combination of a helically-wound spiral and associated connector rods defines a plurality of widthwise side-by-side open-access recesses 32, 34. Such recesses extend across the width of the belt and are utilized in shaping roll protrusions for uniform belt drive and increased drive contact across the width of the belt. That is, parallelogram-shaped protrusions are machined on the surface of a drive roll or sprocket so as to interfit with the confronting surface openings 32, 34 of the conveyor belt. Thus, a drive roll or sprocket having specially-shaped protrusions 26, 28 provides for uniform drive across the belt width and increased widthwise dimensional drive contact. A woven wire conveyor system of this type is disclosed in U.S. Pat. No. 6,041,916, the entire contents of which are hereby incorporated by reference.

One limiting aspect of such a woven wire conveyor system is the decrease in effectiveness of the drive sprockets and rolls with protrusions once there is a build-up of product and/or debris on the surface of the roll from where the protrusions begin to protrude radially outward, i.e., the root diameter. One theory in this regard is that the occurrence of build-up of product and/or debris causes the belt to ride above the desired pitch diameter of the roll, thereby creating a pitch mismatch which causes the protrusions to lose proper contact with the open recesses in the woven wire mesh. Ultimately, this loss of proper contact can cause the belt to cease movement and lead to system failure.

While the conveyor belt of U.S. Pat. No. 6,041,916 exhibits outstanding performance and has enjoyed substantial commercial success, the eventual build-up of product and/or debris imposes a potential limitation on utilizing the belt to its fullest capability. Accordingly, there exists a need in the marketplace for a woven wire conveyor system that can reduce or substantially eliminate the build-up of product and/or debris and thereby provide a cleaner conveying environment.

SUMMARY OF THE INVENTION

These and other objects are met by a conveyor system comprising a woven-wire belt assembled from interwoven helically-wound spirals and connector rods, a pair of connector rods being associated with each helically wound spiral to define open-access recesses of uniform cross-sectional configuration and dimension, said recesses extending in uniformly spaced locations across a width of said belt; and at least one rotatable member including an outer cylindrical surface symmetrically disposed relative to a central axis of rotation of said member and a plurality of spaced, uniformly radially-oriented protrusions on said outer cylindrical surface for engaging said open-access recesses of said woven-wire belt, each of said protrusions including a parallelogram-shaped body substantially corresponding to the cross-sectional configuration and dimension of correspondingly-located recesses of said woven-wire belt. The rotatable member includes a hollow tubular member and the outer cylindrical surface of said at least one rotatable member includes a plurality of openings into an interior of the hollow tubular member.

A further aspect of the invention provides a rotatable member, for use with an elongated woven-wire belt assembled from spiral wires and connector rods which define recesses, of preselected uniform cross-sectional configurational and dimensional characteristics and having a preselected depth dimension for confronting a rotatable member. The rotatable member comprises a hollow tubular member defining an outer cylindrical surface symmetrically disposed in relation to a central axis of rotation for said rotatable member, a plurality of rows of uniformly radially-oriented protrusions on said cylindrical surface for use in engaging recesses presented by interwoven spiral wires and connector rods of a woven-wire belt, and a plurality of slotted opening formed between adjacent said rows of protrusions.

Another aspect of the invention provides a rotatable conveyor belt member for use with a woven-wire belt formed by spiral wires and connector rods, a pair of connector rod being associated with each helically wound spiral so as to define open-access recesses of uniform cross-sectional configuration and dimension which extend in uniformly spaced locations across a width of the belt. The rotatable member comprises an outer cylindrical surface symmetrically disposed relative to a central axis of rotation; a plurality of uniformly radially-oriented protrusions on said outer cylindrical surface for engaging uniform open-access recesses of the woven-wire belt, each of said protrusions including a parallelogram-shaped body substantially corresponding to the cross-sectional configuration and dimension of correspondingly-located recesses of the woven-wire belt; and a plurality of slotted opening formed between adjacent rows of said protrusions.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION OF THE INVENTION

Figure 1:
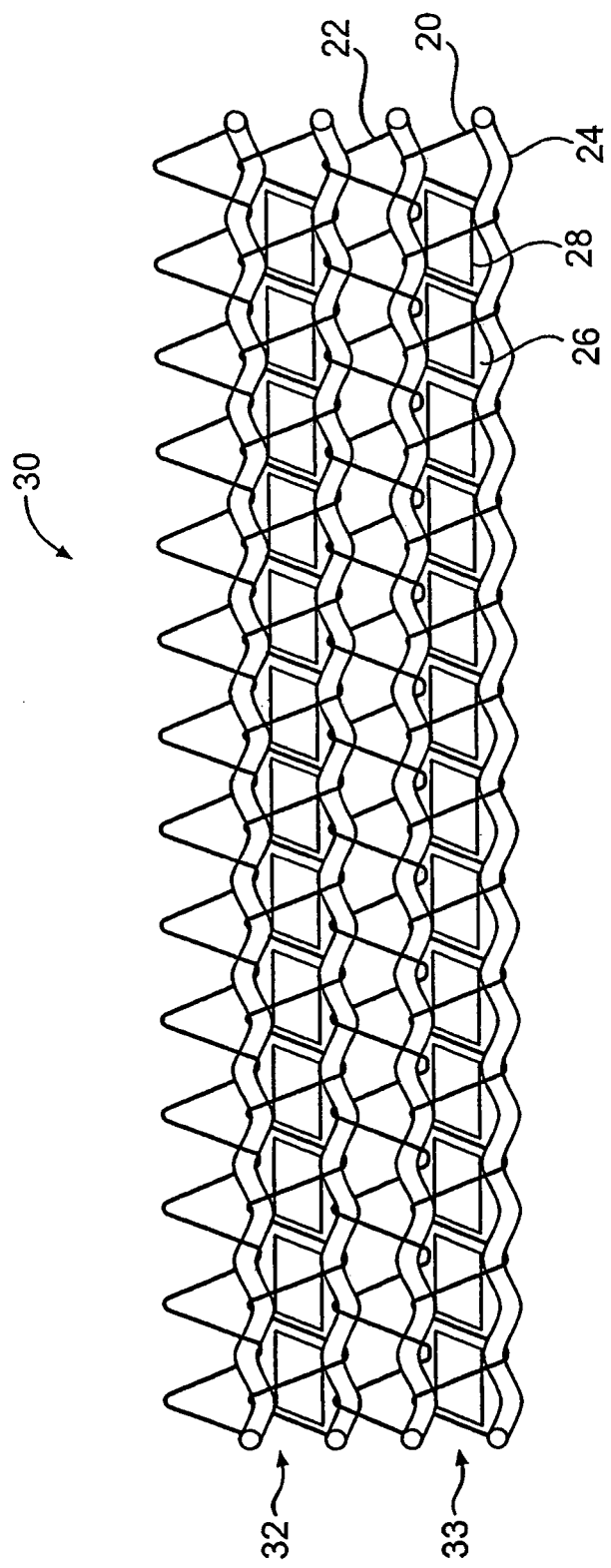
FIG. 1 is an elevational view, partly schematic and with portions broken away, of a segment of a conventional woven wire conveyor system.
Figure 2:
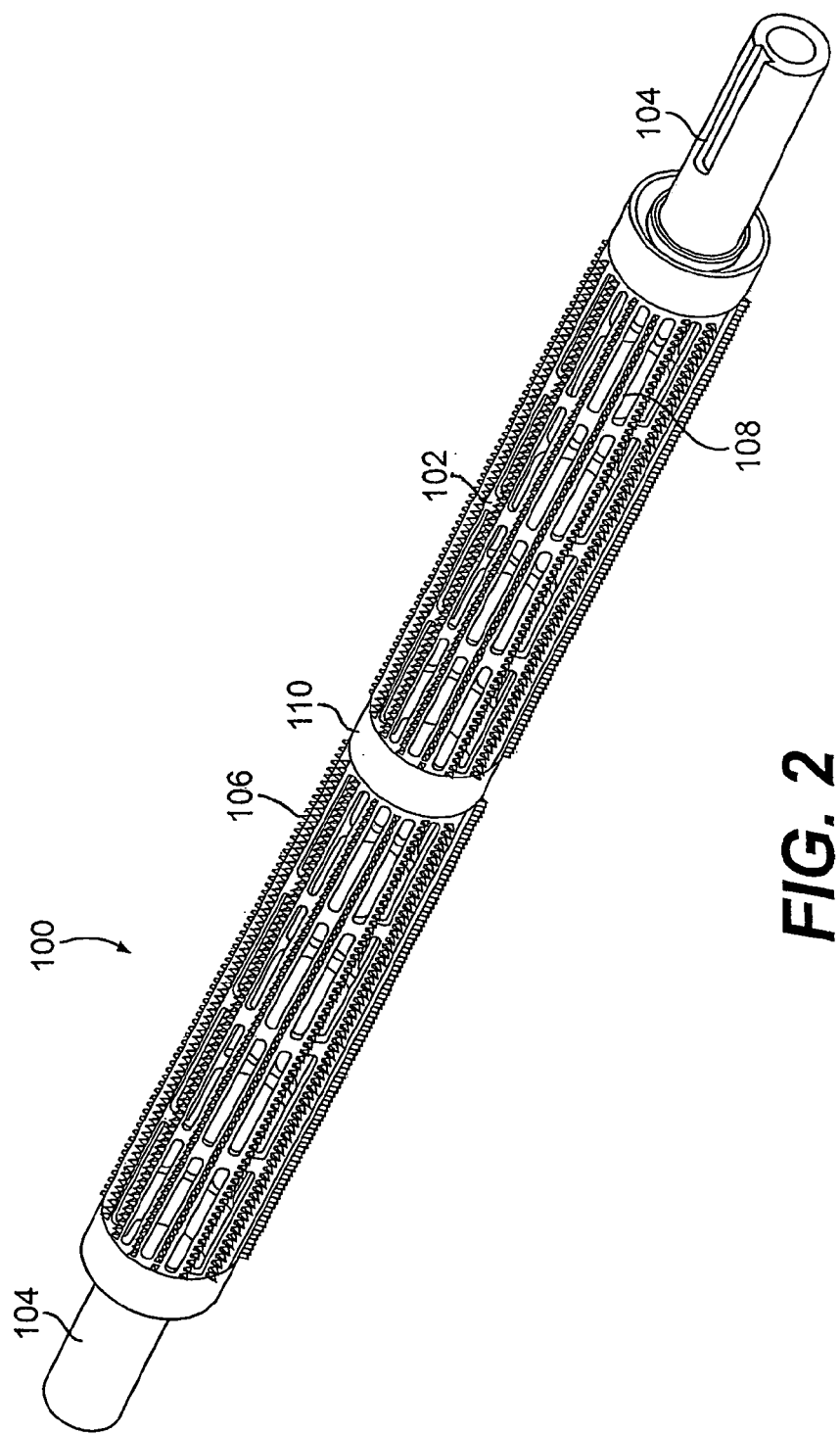
FIG. 2 is a perspective view of drive roll for a woven wire belt conveyor according to a preferred embodiment of the invention.
Figure 3:
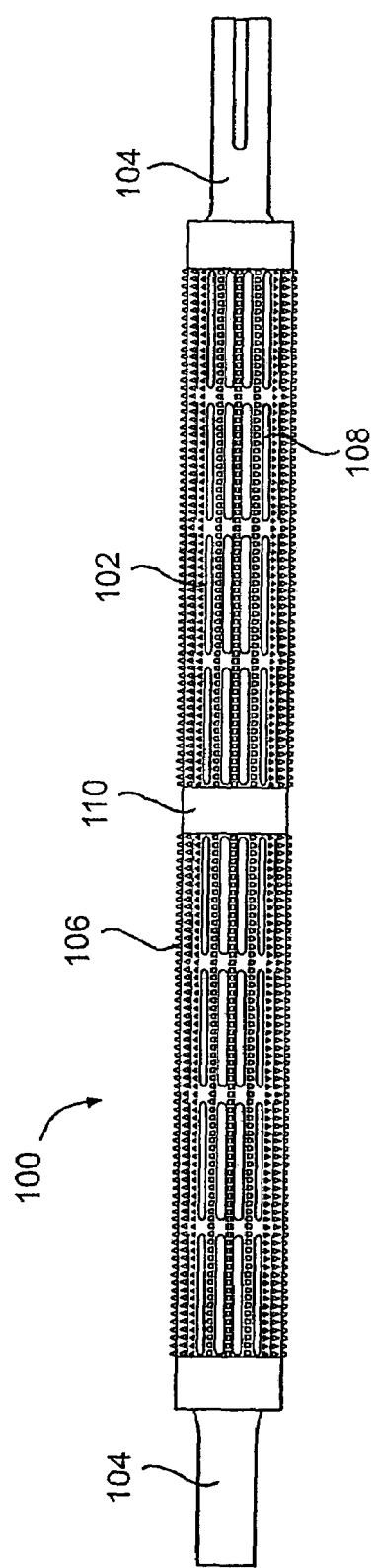
FIG. 3 is a front elevational view of drive roll shown in FIG. 2.

A drive roll for use with a woven wire conveyor belt in accordance with the present invention is shown generally in FIGS. 2 and 3 by reference numeral 100. Roll 100 preferably comprises a heavy-walled tubular member 102 and a stub shaft 104 disposed on each end thereof. The tubular member 102 includes a plurality of protrusions or teeth 106 for engaging a woven wire conveyor belt, as known in the art and described more fully in U.S. Pat. No. 6,041,916. The tubular member 102 further includes a plurality of longitudinal slots or openings 108, as explained in detail below.

Figure 4:
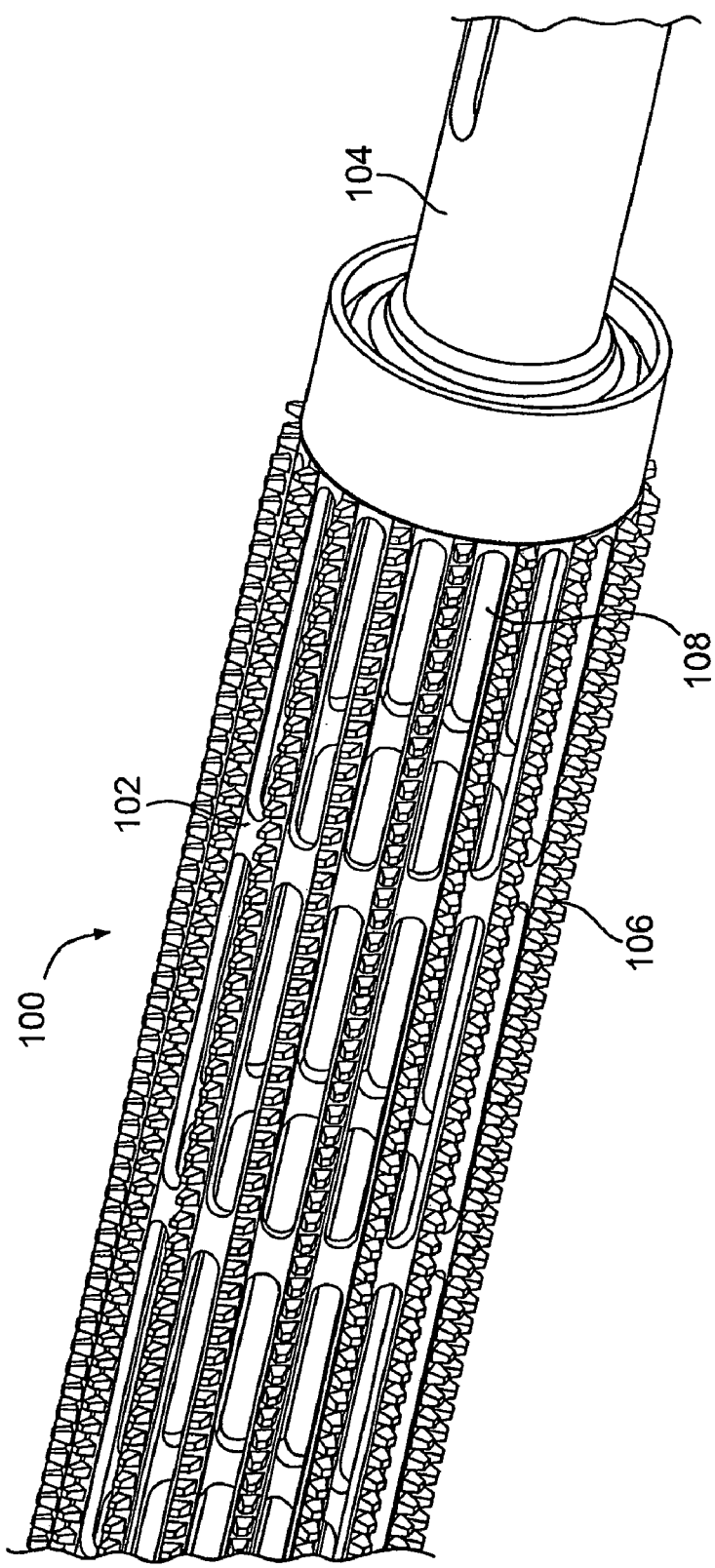
FIG. 4 is an enlarged, partially broken away perspective view of the drive roll shown in FIG. 2.
Figure 5:
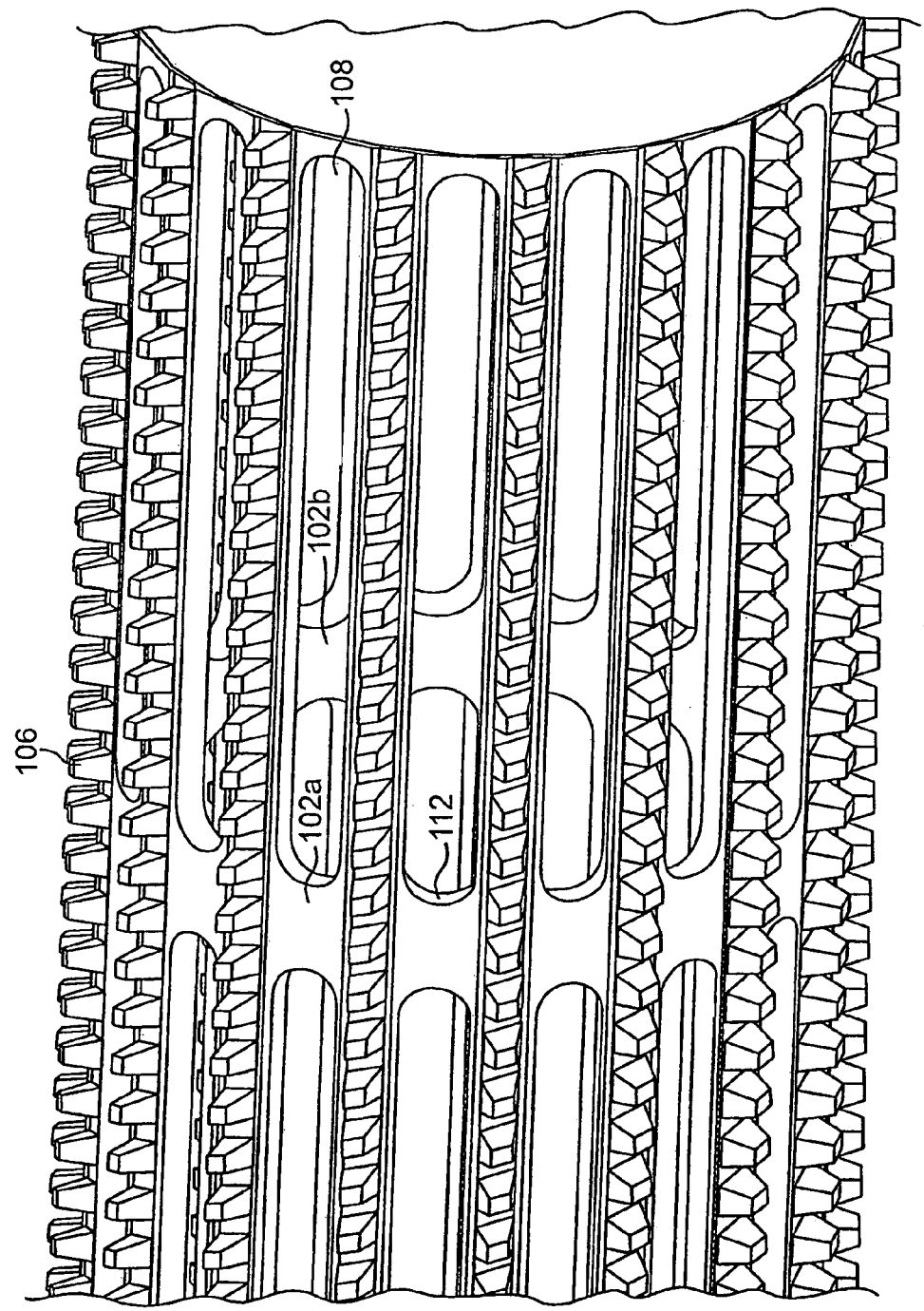
FIG. 5 is a further enlarged, partially broken away perspective view of the drive roll shown in FIG. 2.

Referring also to FIGS. 4-5, slots 108 are formed between the circumferential rows of teeth 106 by removing some of the material from the wall of the tubular member. This is advantageous in reducing build-up of product and/or debris since the surface of the tubular member is an area where build-up is most likely to occur. A circumferential band 110 of material remains intact at predefined distances along the length of the roll 100 so as to maintain the required rigidity of the roll. As best shown in FIG. 5, in a preferred embodiment the slots 108 include a tapered wall surface extending from the outer surface of the tubular member 102a to the inner surface 102b thereof.

Figure 6:
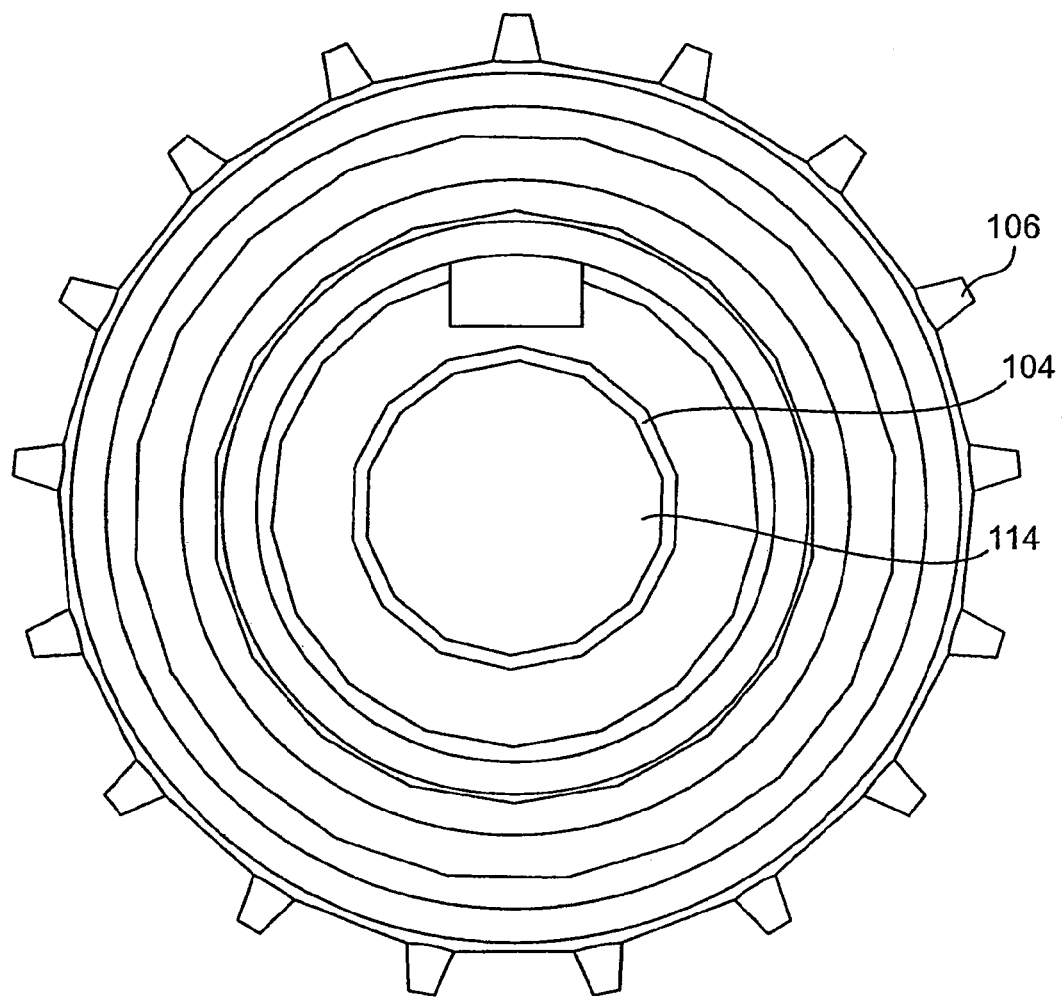
FIG. 6 is an enlarged end elevational view of the drive roll shown in FIG. 2.

The stub shafts 104 are preferably welded to the inner surface 102b of the tubular member 102 and act as bearing surfaces for the roll 100 during operation. The stub shafts 104 include a central bore 114 extending to the interior of the tubular member 102, as shown in FIG. 6. In a preferred embodiment, the inner wall surface of central bore 114 is also tapered from the exterior end towards the interior of the tubular member 102.

Figure 7:
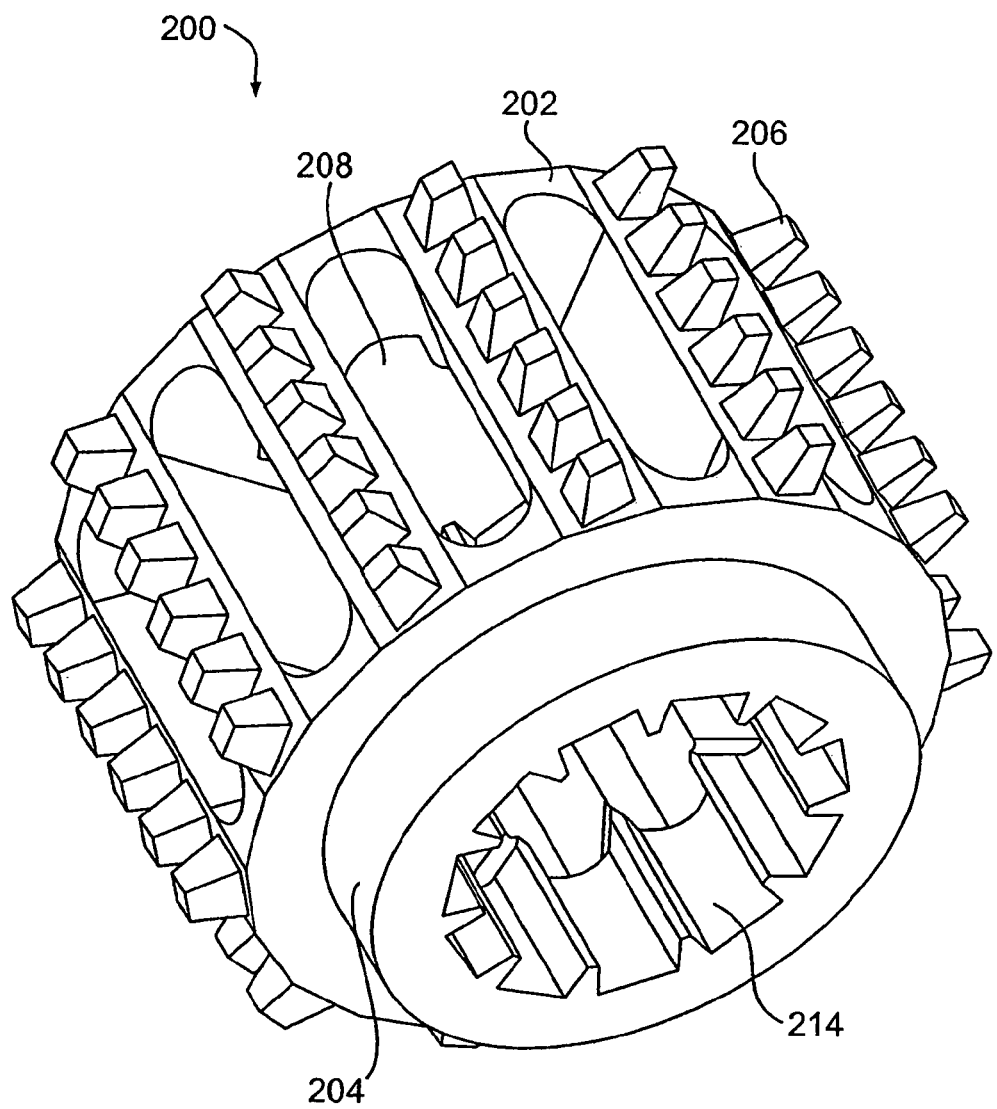
FIG. 7 is a perspective view of drive sprocket for a woven wire belt conveyor according to a further preferred embodiment of the present invention.

A further embodiment of the invention directed toward a cleaning sprocket 200 is shown in FIG. 7. Sprocket 200 preferably comprises a body member 202 and a hub 204 disposed on each end thereof such that the sprocket 200 may be mounted on a solid shaft. The body member 202 includes a plurality of protrusions or teeth 206 for engaging a woven wire conveyor belt, as known in the art and described more fully in U.S. Pat. No. 6,041,916. The body member 202 further includes a plurality of longitudinal slots or openings 208 formed between the circumferential rows of teeth 206 by removing some of the material from the wall of the body member. The slots 208 may also include a tapered wall surface extending from the outer surface of the body member to the inner surface thereof. The hub 204 includes a plurality of cut-out openings 214 disposed around the inner diameter perimeter thereof. Thus, when mounted on hub 204, the openings 214 will allow cleaning fluid or the like to pass between the sprocket 200 and the hub 204.

The above-described drive roll 100 and sprocket 200 are useful in preventing the build-up of product and/or debris due to the formation of slots 108, 208 along the root diameter of the rotatable member, and the potential drawbacks associated therewith. The slots 108, 208 eliminate the surface on the roll where build-up is most likely to occur and they encourage any product or debris that does occur to pass therethrough and enter the interior of the roll. The tapered wall surface 112 is provided to assist in directing product and debris into the interior of the tubular member 102, 202. In addition, because the formation of the slots reduces the contact surface area between the conveyor belt and drive roll 100 or sprocket 200, contact pressure is increased in the remaining areas where build up may occur, thereby resulting in a better cleaning action. One application where this feature is most useful is in a freezing environment where ice builds up from the moisture on the belt repeatedly cycling through below freezing and ambient conditions. The bi-product of ice builds up on the root diameter of the roll and causes the potential engagement issues described above. With the reduction of the surface area on the rotatable member 100, 200 due to the formation of the slots 108, 208 this problem is minimized in freezing applications.

Further, the central bore 114 and openings 214 of the shaft 104 and hub 204, respectively, define opening ports to the center of the hollow tubular member 102 and body member 202. The central bore 114 and openings 214 are thus advantageous in allowing the introduction of a cleaning fluid through the roll 100 and sprocket 200 to flush out any product or debris that has accumulated within the tubular member 102 or body member 202. This feature is most useful in applications having stringent cleaning requirements for removal of debris from the system, such as, for example, during food processing, In combination with the slots 108, 208 formed in the circumfery of the rotatable member 100, 200, the rotatable member 100, 200 is ideal for use in so-called "dirty" applications. That is, by flushing pressurized water or the like out through the slots, the action of the water may be useful in cleaning the woven wire mesh conveyor belt.

Although certain preferred embodiments of the present invention have been shown and described in detail, it should be understood that various changes and modifications may be made therein without departing from the scope of the appended claims.

We claim:

1. A conveyor system comprising:
   a woven-wire belt assembled from interwoven helically-wound spirals and connector rods, a pair of connector rods being associated with each helically wound spiral to define open-access recesses of uniform cross-sectional configuration and dimension, said recesses extending in uniformly spaced locations across a width of said belt; and
   at least one rotatable member including an outer cylindrical surface symmetrically disposed relative to a central axis of rotation of said member and a plurality of spaced, uniformly radially-oriented protrusions on said outer cylindrical surface for engaging said open-access recesses of said woven-wire belt, each of said protrusions including a parallelogram-shaped body substantially corresponding to the cross-sectional configuration and dimension of correspondingly-located recesses of said woven-wire belt;
   wherein said at least one rotatable member includes a hollow tubular member and the outer cylindrical surface of said at least one rotatable member includes a plurality of openings into an interior of the hollow tubular member.

2. The conveyor system of claim 1, wherein said plurality of openings are configured to avoid a build up of product and/or debris on the at least one rotatable member.

3. The conveyor system of claim 1, wherein said plurality of openings assist in cleaning the open-access recesses of the woven wire belt.

4. The conveyor system of claim 1, wherein said at least one rotatable member further includes a shaft disposed on each end thereof, said shaft having a hollow central bore.

5. The conveyor system of claim 1, wherein said at least one rotatable member further includes a hub disposed on each end thereof, said hub including a plurality of cut-out openings.

6. The conveyor system of claim 1, wherein said plurality of openings define a plurality of longitudinal slots along a length of said at least one rotatable member.

7. The conveyor system of claim 1, wherein said plurality of spaced, uniformly radially-oriented protrusions form a plurality of rows along a length of said at least one rotatable member, said plurality of openings being formed between adjacent said rows of spaced, uniformly radially-oriented protrusions.

8. The conveyor system of claim 1, wherein said at least one rotatable member includes a circumferential band of intact material at predefined distances along a length of said rotatable member.

9. The conveyor system of claim 1, wherein said plurality of openings include a tapered wall surface.

10. A rotatable member, for use with an elongated woven-wire belt assembled from spiral wires and connector rods which define recesses, of preselected uniform cross-sectional configurational and dimensional characteristics and having a preselected depth dimension for confronting a rotatable member, said rotatable member comprising:
a hollow tubular member defining an outer cylindrical surface symmetrically disposed in relation to a central axis of rotation for said rotatable member,
a plurality of rows of uniformly radially-oriented protrusions on said cylindrical surface for use in engaging recesses presented by interwoven spiral wires and connector rods of a woven-wire belt, and
a plurality of slotted opening formed between adjacent said rows of protrusions.

11. The rotatable member of claim 10, wherein said plurality of slotted openings are configured to avoid a build up of product and/or debris on the rotatable member.

12. The rotatable member of claim 10, further including a shaft or hub disposed on each end thereof, said shaft or hub having a hollow central bore.

13. The rotatable member of claim 10, further including a circumferential band of intact material at predefined distances along a length of said rotatable member.

14. The rotatable member of claim 10, wherein said plurality of slotted openings include a tapered wall surface.

15. A rotatable conveyor belt member for use with a woven-wire belt formed by spiral wires and connector rods, a pair of connector rod being associated with each helically wound spiral so as to define open-access recesses of uniform cross-sectional configuration and dimension which extend in uniformly spaced locations across a width of the belt, said rotatable conveyor belt member comprising:
an outer cylindrical surface symmetrically disposed relative to a central axis of rotation;
a plurality of rows of uniformly radially-oriented protrusions on said outer cylindrical surface for engaging uniform open-access recesses of the woven-wire belt, each of said protrusions including a parallelogram-shaped body substantially corresponding to the cross-sectional configuration and dimension of correspondingly-located recesses of the woven-wire belt; and
a plurality of slotted openings formed between adjacent rows of said protrusions.

16. The rotatable member of claim 15, wherein said plurality of slotted openings are configured to avoid a build up of product and/or debris on the rotatable member.

17. The rotatable member of claim 15, further including hub disposed on each end thereof, said hub having a hollow central bore and a plurality of cut-out openings.

18. The rotatable member of claim 15, further including a circumferential band of intact material at predefined distances along a length of said rotatable member.

19. The rotatable member of claim 15, wherein said plurality of slotted openings include a tapered wall surface.

* * * * *